United States Patent
Baumann

(10) Patent No.: US 8,292,003 B2
(45) Date of Patent: Oct. 23, 2012

(54) HANDHELD TOOL WITH A LINEAR OSCILLATING DRIVE

(75) Inventor: Marco Baumann, Hilzingen (DE)

(73) Assignee: Biax Machinen GmbH, Neuhausen Am Rheinfall (CH)

( * ) Notice: Subject to any disclaimer, the term of this patent is extended or adjusted under 35 U.S.C. 154(b) by 273 days.

(21) Appl. No.: 12/764,378

(22) Filed: Apr. 21, 2010

(65) Prior Publication Data

US 2010/0270049 A1    Oct. 28, 2010

(30) Foreign Application Priority Data

Apr. 22, 2009  (DE) .......... 10 2009 019 081

(51) Int. Cl.
*B27F 5/00* (2006.01)
*B23Q 11/00* (2006.01)

(52) U.S. Cl. ....... 173/114; 173/91; 173/162.1; 173/208; 173/212; 92/192

(58) Field of Classification Search .......... 173/208, 173/212, 162.1, 169, 201, 162.2, 91, 114, 173/210, 211, 168; 92/192, 243, 246, 28
See application file for complete search history.

(56) References Cited

U.S. PATENT DOCUMENTS

| | | | |
|---|---|---|---|
| 3,150,570 A | | 9/1964 | Johnson |
| 3,745,890 A | | 7/1973 | Costarella |
| 3,902,405 A | | 9/1975 | Costarella |
| 4,681,172 A | * | 7/1987 | Mikiya et al. ................. 173/210 |
| 5,279,120 A | * | 1/1994 | Sasaki ............................ 60/413 |
| 5,626,199 A | * | 5/1997 | Henry et al. .................. 173/211 |
| 6,415,876 B1 | * | 7/2002 | Bollinger et al. ............. 173/135 |
| 7,331,407 B2 | * | 2/2008 | Stirm et al. ................... 173/201 |

FOREIGN PATENT DOCUMENTS

| | | |
|---|---|---|
| BE | 509458 | 8/1953 |
| DE | 288325 | 11/1913 |
| DE | 314231 | 11/1915 |
| DE | 316135 | 11/1915 |
| DE | 19746447 | 4/1999 |
| EP | 0284772 | 10/1988 |
| EP | 1028826 B1 | 3/2002 |
| FR | 2635365 | 2/1990 |
| WO | 9920424 | 4/1999 |

OTHER PUBLICATIONS

Search Report EP 10 00 1640.

* cited by examiner

*Primary Examiner* — Scott A. Smith
(74) *Attorney, Agent, or Firm* — Brinks Hofer Gilson & Lione

(57) ABSTRACT

A handheld tool with a pneumatically operated linear oscillating drive is provided. The handheld tool has a motor housing and a piston movable in the motor housing, which separates the two working chambers of the motor housing from one another. A piston crown faces toward one chamber of the two working chambers, with a compressed air supply line toward the motor housing and a slide valve, which controls an alternating supply of compressed air to one and the other of the two working chambers, and with an exhaust air opening in the motor housing. The handheld power tool is distinguished in that the piston additionally has a piston skirt facing toward the other chamber of the two working chambers.

9 Claims, 2 Drawing Sheets

HANDHELD TOOL WITH A LINEAR OSCILLATING DRIVE

CROSS-REFERENCE TO RELATED APPLICATIONS

Figure 1:
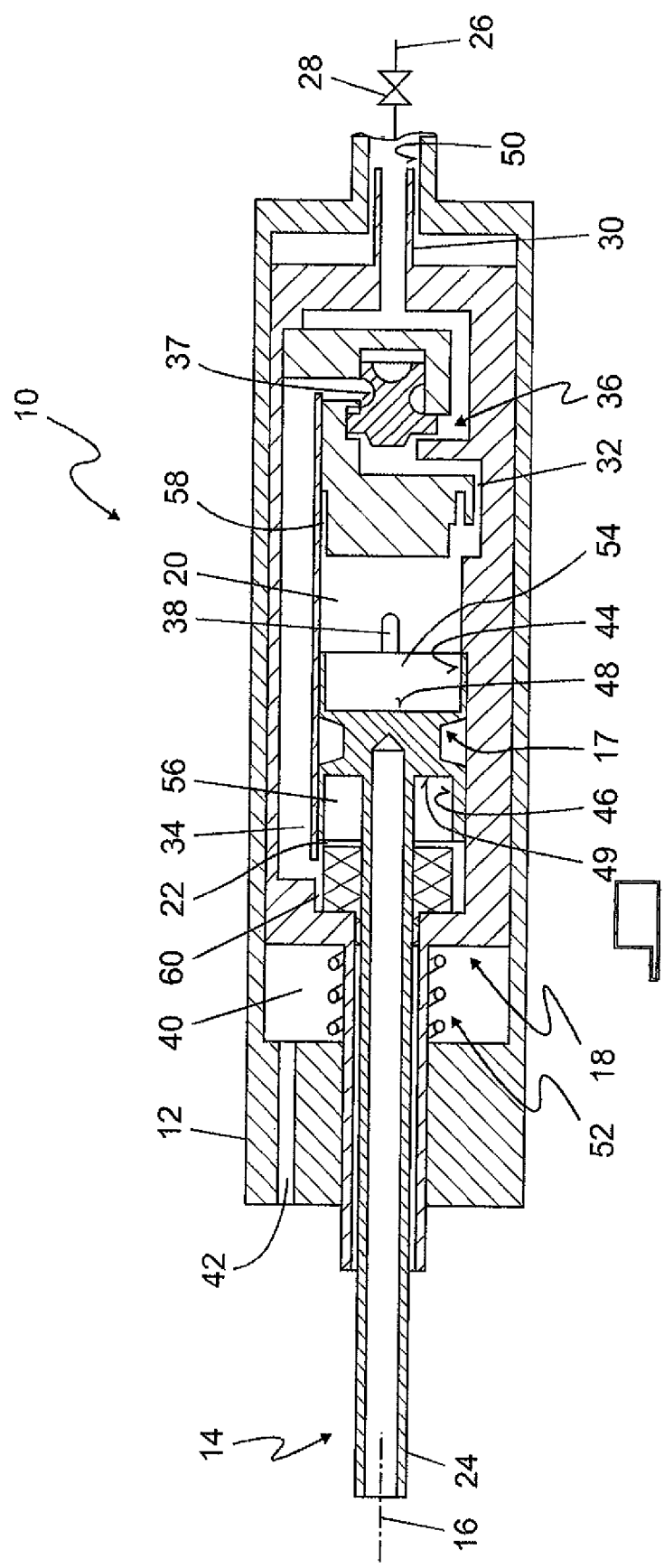

This application claims the benefit of DE 10 2009 019 081.3, filed Apr. 22, 2009. The disclosure of the above application is incorporated herein by reference in its entirety.

FIELD

The present disclosure relates to handheld tools, and in particular, pneumatically operated handheld tools.

BACKGROUND

The statements in this section merely provide background information related to the present disclosure and may not constitute prior art.

Handheld tools are often pneumatically operated, such as the tool illustrated and described in EP 1028826 B1. The pneumatically operated linear oscillating drive of such a handheld tool has a motor housing and a piston arranged in the motor housing, which separates two working chambers of the motor housing from one another and has a piston skirt facing towards one of the two working chambers. A supply of compressed air to the two working chambers is controlled via a compressed air supply line to the motor housing and a slide valve. The compressed air is supplied in such a manner that the piston is alternatively driven in one and the other direction and thus carries out an oscillating back and forth motion. The two working chambers are vented via an exhaust air opening in the motor housing.

The piston drives an oscillating tool, such as a saw blade or a filing tool, by means of a piston rod. According to EP 1028826 B1, the piston base is thin-walled and arched and transitions at its periphery into a thin-walled cylindrical sleeve in order to keep small the mass of the piston, and thus also the amount of reaction forces to be dissipated during its oscillating movement, small. Such a thin-walled sleeve is also referred to in the application as a piston skirt. The piston base and the cylindrical sleeve forming the piston skirt form a piston crown, whose interior faces away from one of the two working chambers. In other words: a section through the piston in the movement direction yields a U-shaped cross section with the two legs of the U pointing towards one of the working chambers.

The energy stored in the compressed air is ultimately converted by such a handheld tool into mechanical work. In order to be able to generate forces as large as possible for specific dimensions and specific pressures and to be able to convert most of the energy connected with producing compressed air into mechanical energy, it is of general interest to ensure a good efficiency of the pneumatic linear oscillating drives. Under constant pneumatic conditions such as pressure and flow rate, for example, the cutting power of a saw connected to the linear oscillating drive increases with improved efficiency.

SUMMARY

The present disclosure provides a handheld tool with a pneumatic linear oscillating drive having an improved efficiency. This is achieved in a handheld tool with the characterizing features of claim 1.

The present disclosure is based on the realization that a thin-walled piston skirt expands radially under the force of the compressed air, which leads to an improved sealing of the annular gap between the piston and the motor housing. The better the sealing, the greater the pressure differential between the two working chambers and thus also the resulting power. The improved sealing is achieved with the present disclosure in both in a forward as well as in a backward movement of the piston. The same power is generated in particular in both movement directions of the piston rod in this way.

Further advantages result from the dependent claims, the description and the enclosed figures.

It is understood that the above-mentioned features, which will be explained below, can be used not only in the respective specified combination, but also in other combinations or alone, without departing from the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows one form of a handheld tool according to the teachings of the present disclosure; and FIGS. 2a-2e show other forms of a double piston as a component of such a handheld tool in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

FIG. 1 shows a handheld tool 10 with a handle body 12 and a piston rod 14, which is movably mounted along an axis 16 in handle body 12.

The piston rod 14 is rigidly connected to a piston 17, which is movably mounted in a motor housing 18 inside the handle body 12 in direction toward axis 16 and movably separates a first working chamber 20 from a second working chamber 22 of the motor housing 18. Each of the two working chambers 20, 22 considered separately is alternatively filled with compressed air and vented, wherein the two working chambers 20, 22 area alternatively with respect to one another.

A filling of the first working chamber 20 produces a resulting pressure force on piston 16, with which the piston rod 14 is driven out of the handle body 12. With a filling of the second chamber 22 with compressed air, on the other hand, the piston rod 14 is drawn instead into the handle body. The motor housing 18 with the piston 17, which moves back and forth under the influence of compressed air, and the piston rod 14, which is rigidly coupled thereto, represents thus a linear oscillating drive. The end 24 of the piston rod 14 facing away from handle body 12 serves for the attachment of a tool, such as a scraper, a chisel, a saw blade, a knife, or a file, wherein this list not exclusive.

The handheld tool 10 has a compressed air connector 26 with a compressed air control valve 28, with which a flow of compressed air into working chambers 20, 22 can be controlled. The compressed air control valve 28 is actuated by an actuating means of the handheld tool 10, which is not shown, as disclosed, for example, in EP 1028826 in the form of a manually operated knee lever.

The compressed air enters the motor housing 18 via the compressed air connector 26 of handheld tool 10 and a compressed air connector piece 30 of motor housing 18, and flows either via a first compressed air channel 32 into the first working chamber 20, or via a second compressed air channel 34 into the second working chamber 22, depending on the position of a slide valve 36. In the illustrated position of slide valve 36, compressed air flows via the first compressed air channel 32 into the first working chamber 10 and drives the piston 17 toward the left. The piston 17 runs via an exhaust air opening 38 into motor housing 18, which represents an exhaust air cross section towards the exterior outside of handheld tool 10.

The ventilation of the working chambers 20, 22 of motor housing 18 takes place via an exhaust air opening 38 and an exhaust air channel running outside the plane of the drawing to the exterior, for example, on a side of the handheld tool that faces away from the oscillating tool. In the form shown in FIG. 1, the working chambers 20, 22 of the motor housing 18 are vented alternatively or additionally via the exhaust air opening 38 and an exhaust air channel 42 running outside of the plane of the drawing into an exhaust air space 40 on the side of the handheld tool facing the oscillating tool.

In the illustrated position, the piston 17 running towards the left has just opened an exhaust air cross section toward the exhaust air opening 38.

The compressed air volume flow into the first working chamber 20 increases in this way. As a consequence, the pressure relationships at the slide valve 36 change in such a way that the latter is drawn to the left and thus closes the flow cross section toward the first working chamber 20 as well as opens a flow cross section toward the second working chamber 22 via the annular groove 37 in the slide valve 36.

The compressed air flowing then into the second working chamber 22 subsequently drives the piston 17 toward the right. The piston 17 running toward the right then opens an exhaust air cross section from the second working chamber to the exhaust air opening 38, whereupon the slide valve 36 switches back to filling the first working chamber 20.

The handheld power tool 10 is distinguished in that the piston 17 has both a first piston skirt 44 facing toward the first working chamber 20 and a second piston skirt 46 facing toward the second working chamber 22.

As the respective working chamber 20, 22 is filled with compressed air, the respective thin-walled piston skirt 44, 46 expands in radial direction and is thus in intimate contact with the inside wall of the motor housing 18, which forms a running and sealing surface for the piston 17. This intimate contact constricts the annular gap between the piston 17 and the motor housing 18 and leads thus to a better sealing between the two working chambers. The amount of compressed air flowing between piston 17 and motor housing 18 from the pressurized to the vented working chamber decreases as a consequence. The pressure differential between working chambers 20, 22 increases as a result, and the air losses decrease. A greater value of the resulting pressure force results due to the greater pressure differential, which is available as propulsion force at the tool.

The improved sealing effect occurs whenever the working chamber facing the respective piston skirt 44, 46 is filled with compressed air. In contrast to the state of the art, the pneumatic linear oscillating drive according to the present disclosure has a second piston skirt 46 facing the second working chamber 22, in addition to the first piston skirt 44 facing toward the first working chamber 20. The improved sealing effect is achieved in this way both in the backward and forward movement of the piston 17. A flow of air between the piston 17 and the motor housing 18 during filling of the second working chamber 22 with compressed air therefore occurs to a lesser extent than in the state of the art.

In one form of the present disclosure, a material cross section of the piston skirts 44, 46 is smaller than a material cross section of a base 48, 49 of the piston 17. The resilience of the piston skirts 44, 46 in the radial direction is increased thereby in comparison to a form with overall the same material thickness as that of the piston bases 48, 49, without causing a reduction of the pressure resistance of piston bases 48, 49. The sealing between the working chambers 20, 22 is overall further improved thereby.

The piston skirts 44, 46 are adapted with regard to their material and dimensions to the operating pressure of a compressed air supply for the handheld tool 10 in such a way that the piston skirts 44, 46 expand elastically under the influence of the compressed air.

The desired improved sealing is achieved through the elastic expansion without having to put up with a significantly increased friction, since the expansion regresses during venting of the prospective working chamber 20, 22.

In one form, the piston 17 and the motor housing 18 are made of metallic materials. A long service life as well as a high pressure resistance and thus a high performance of handheld power tool 10 are achieved in this way.

Another configuration is characterized in that a running surface of the piston 17 and/or the motor housing 18 is coated with a friction-reducing material or in that friction-reducing material is embedded into a metallic material of the running surface of the piston 17 and or the motor housing 18. The friction is reduced by means of these forms of the present disclosure, which has as desired consequence an increase in performance and a decrease of wear.

In one form, the metallic materials comprise light metal or consist of light metal, in particular aluminum, because the mass forces during operation of handheld power tool 10 are limited in this way to correspondingly low values.

In order to improve the wear resistance and thus the service life, another form of the present disclosure is characterized in that the running surfaces are hard-coated.

As an alternative to a construction with light metal, the motor housing and/or the piston can consist of steel. The construction of the piston from steel is more favorable in terms of production because the thin material cross section of the piston skirts, which is important for the expandability, can be easily and cost-effectively produced and from steel. In a form made of steel, a hardened surface is favorable for wear reduction.

In another form, the motor housing 18 is elastically movably mounted in movement direction of the piston 17 inside a handle body 12 of handheld power tool 10.

This type of mounting allows an oscillation of the motor housing 18 in opposite phase to the oscillation of the piston 17, which contributes to a desired cancellation of the mass forces.

The compressed air connector 26 of the handheld power tool 10 in the represented form comprises a section 50 configured as a guide for a pressure connection piece 30 of the motor housing 18, in which the pressure connection piece 30 is axially movably closely mounted.

A pressure force acts on the cross section of the pressure connection piece 30 within the guide 50 and deflects the motor housing 18 against the force of an elastic reset element 52, for example, a spiral spring arranged in the exhaust air volume 40. The pressure forces inside the working chambers 20, 22 are superimposed on these forces. These pressure forces drive the motor housing 18 in the direction opposite to the drive force of the piston. As a desired consequence, the motor housing 18 and piston 17 move in phase opposition, which contributes to a good vibration cancellation, and thus to an overall good handling of the handheld tool 10.

Each piston skirt 44, 46 forms a piston crown 54, 56 with the corresponding piston base, so that the piston 17 has two rigidly mutually connected piston crowns 54, 56, which are open toward opposite sides.

Each piston crown 54, 56 has a cylindrical side surface in form of a piston skirt 54, 46, a crown base 48, 49, and a crown opening opposite to the crown base. The crown bases 48, 49 of the two crowns 54, 56 have a fixed distance from one another and are arranged between the crown openings, so that the crown bases 54, 56 open in opposite directions.

In one form, the linear oscillating drive has damping for each end position of piston 17. In the form shown in FIG. 1, this end position damping is produced by the fact that the motor housing 18 at the end of a working chamber 20, 22, which is opposite piston 17, has a corresponding annular groove 58, 60 that forms a receptacle for cylindrical piston skirt 44, 46. The compressed air channels 32, 34 end in an annular groove 58, 60, respectively. During the movement of piston 17 toward the left, the second piston skirt 46 runs into the groove 60 and blocks the compressed air channel 34. An air volume is enclosed in this way by the left end of motor housing 18, in which the second piston crown 56 is encased. The piston 17, which moves further toward the left, compresses this air volume and generates thus a damping force acting to the right on piston 17, which decelerates the further approach to a possible mechanical end position. This applies analogously to the identically functioning structures of first working chamber 20.

Figure 2A:
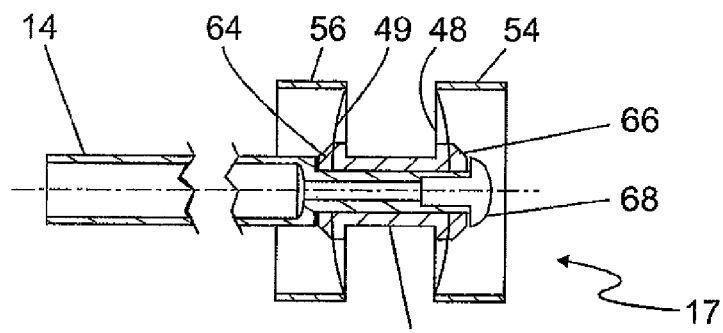

FIG. 2*a* shows the configuration of a double piston 17 comprised by two piston crowns 54, 56 screwed onto a piston rod 14 via a spacer 62 and piston thrust washers 64, 66 with the aid of a screw 68. Due to the convex and thin-walled design of the piston bases, these have an elastically variable diameter. This configuration is characterized in that the piston diameter can expand, not only in the area of the top of the piston crown opening, but also in the area of the piston base, which additionally improves the sealing.

Figure 2B:
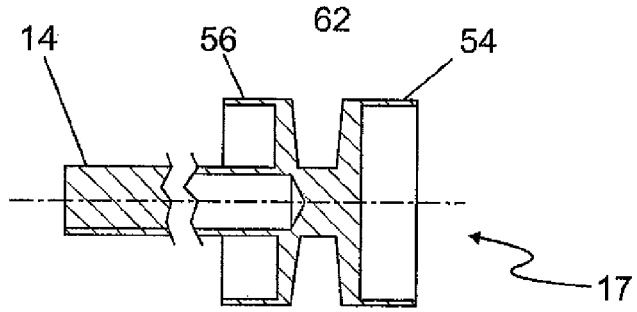

FIG. 2*b* shows a single piece alternative of a double piston 17, in which the piston crowns 54, 56 are produced of solid material together with piston rod 14.

Figure 2C:
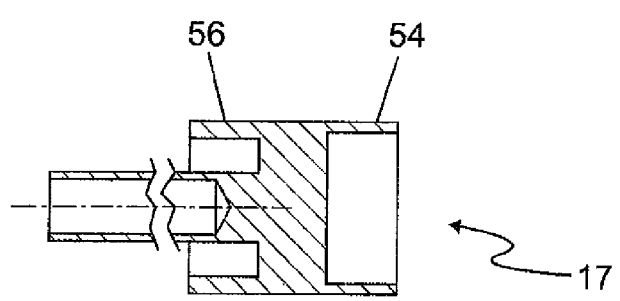

FIG. 2*c* likewise shows a single piece alternative of a double piston 17 in which the piston crowns 54, 56 are produced of solid material together with piston rod 14. This form is overall heavier than the form according to FIG. 2*b*. An additional difference is that the intermediate space between the two piston bases is filled with solid material, which enlarges the inertial mass of the double piston.

Figure 2D:
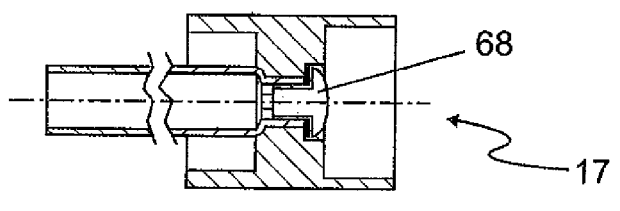

The more compact form makes it possible to do without piston thrust washers if the double piston is to be screwed together with piston rod 14. This is illustrated by FIG. 2*d*.

Figure 2E:
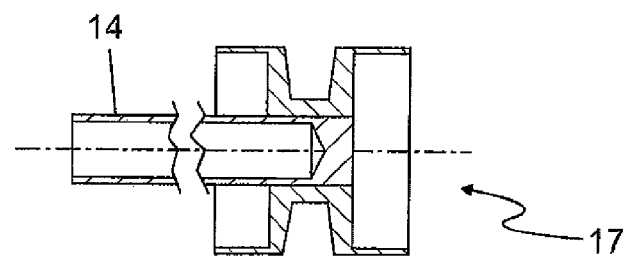

FIG. 2*e* shows a form of a double piston 17 connected to a piston rod 14, wherein the connection can take place alternatively by means of a threaded connection, by gluing, by means of a combination of a threaded connection and gluing, or by means of a press fit. This form is provided due to reasons of strength for the press fit.

In each of the forms, the piston crowns, which are relatively thin-walled and coated on the outside, are radially inflated as the working chambers are filled with compressed air during operation, which leads to the better sealing of the annular gap between the outer surface of the piston and the running and sealing surface of the motor housing. This has the advantage of an improved compression and energy transfer of the compressed air toward the piston. This sealing process results from the symmetry of the double piston in both movement directions of the piston and functions reliably even after many hours of operation.

It should be noted that the disclosure is not limited to the various forms described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A handheld tool with a pneumatically operated linear oscillating drive having a motor housing and a piston movable within the motor housing, which separates two working chambers of the motor housing from one another and has a piston crown pointing toward one chamber of the two working chambers, with a compressed air supply line toward the motor housing and a slide valve, which controls an alternating supply of compressed air to one and the other of the two working chambers, and with an exhaust air opening in the motor housing, wherein the piston and the motor housing are made of metallic materials, and wherein a running surface of at least one of the piston and the motor housing is coated with a friction-reducing material or wherein friction-reducing material is embedded in a metallic material of the running surface of the piston and/or the motor housing, characterized in that the piston additionally has a piston skirt facing toward the other chamber of the two working chambers, wherein the piston crown and skirts are adapted with regard to their material and dimensions to the operating pressure of a compressed air supply of the handheld tool in such a way that the piston crown and skirts expand elastically under the influence of the compressed air and wherein the piston comprises bases which have, with regard to the side pointing to the corresponding working chamber, a convex and thin-walled design so that the piston diameter can expand not only in the area of the piston crown and skirt but also in the area of the piston bases.

2. The handheld tool of claim 1, characterized in that a material cross section of the piston crown and skirts is smaller than a material cross section of the bases of the piston.

3. The handheld tool of claim 1, wherein the friction-reducing material is embedded in a metallic material of the running surface of at least one of the piston and the motor housing.

4. The handheld power tool of claim 1, characterized in that the metallic materials comprise a light metal.

5. The handheld power tool of claim 4, characterized by aluminum as light metal.

6. The handheld power tool of claim 1, characterized in that the running surface is hard-coated.

7. The handheld power tool of claim 1, characterized by steel as the metallic material.

8. The handheld power tool of claim 7, characterized by the piston having a hardened surface.

9. The handheld power tool according to claim 1, characterized in that the motor housing is movably elastically mounted in the movement direction of the piston inside a handle body of the handheld power tool.

\* \* \* \* \*